United States Patent
Ue et al.

(10) Patent No.: US 7,791,796 B2
(45) Date of Patent: Sep. 7, 2010

(54) MOTORIZED TABLE APPARATUS AND MICROSCOPE STAGE

(75) Inventors: Yoshihiro Ue, Hidaka (JP); Yasuaki Kasai, Saitama (JP); Katsuji Horiuchi, Tokyo (JP)

(73) Assignee: Olympus Corporation, Tokyo (JP)

( * ) Notice: Subject to any disclaimer, the term of this patent is extended or adjusted under 35 U.S.C. 154(b) by 354 days.

(21) Appl. No.: 11/820,740

(22) Filed: Jun. 20, 2007

(65) Prior Publication Data

US 2008/0043325 A1 Feb. 21, 2008

(30) Foreign Application Priority Data

Jul. 10, 2006 (JP) .............................. 2006-189331

(51) Int. Cl.
*G02B 21/26* (2006.01)

(52) U.S. Cl. ........................................ 359/393; 359/391

(58) Field of Classification Search .................. 359/368, 359/391–394

See application file for complete search history.

(56) References Cited

U.S. PATENT DOCUMENTS 6,252,333 B1 6/2001 Iino et al.
6,346,710 B1 * 2/2002 Ue .......................... 250/442.11
7,180,662 B2 * 2/2007 Rondeau et al. .............. 359/393
7,635,940 B2 * 12/2009 Ue et al. ...................... 310/317
2003/0201695 A1 10/2003 Funakubo et al.

FOREIGN PATENT DOCUMENTS

| EP | 0 938 144 A2 | 8/1999 |
|---|---|---|
| JP | 07-181277 A | 7/1995 |
| JP | 2000-028767 A | 1/2000 |
| JP | 2005-265996 A | 9/2005 |

* cited by examiner

*Primary Examiner*—Thong Nguyen
(74) *Attorney, Agent, or Firm*—Frishauf, Holtz, Goodman & Chick, P.C.

(57) ABSTRACT

A motorized table apparatus comprises: a support unit for supporting a movement table so as to allow it to move in a single axis direction relative to a stationary unit which is fixed to the movement table; a slide member which is equipped on the movement table and which has a length equivalent to, or more than, a moving range of the movement table; an ultrasonic oscillators which is equipped on the stationary unit, which moves the movement table, and which comprises a single piezoelectric body and two drive elements; and a pressure application unit for supporting so that the two drive elements of the ultrasonic oscillator and the slide member are pressed by a constant force, wherein a plurality of the ultrasonic oscillators are equipped.

7 Claims, 5 Drawing Sheets

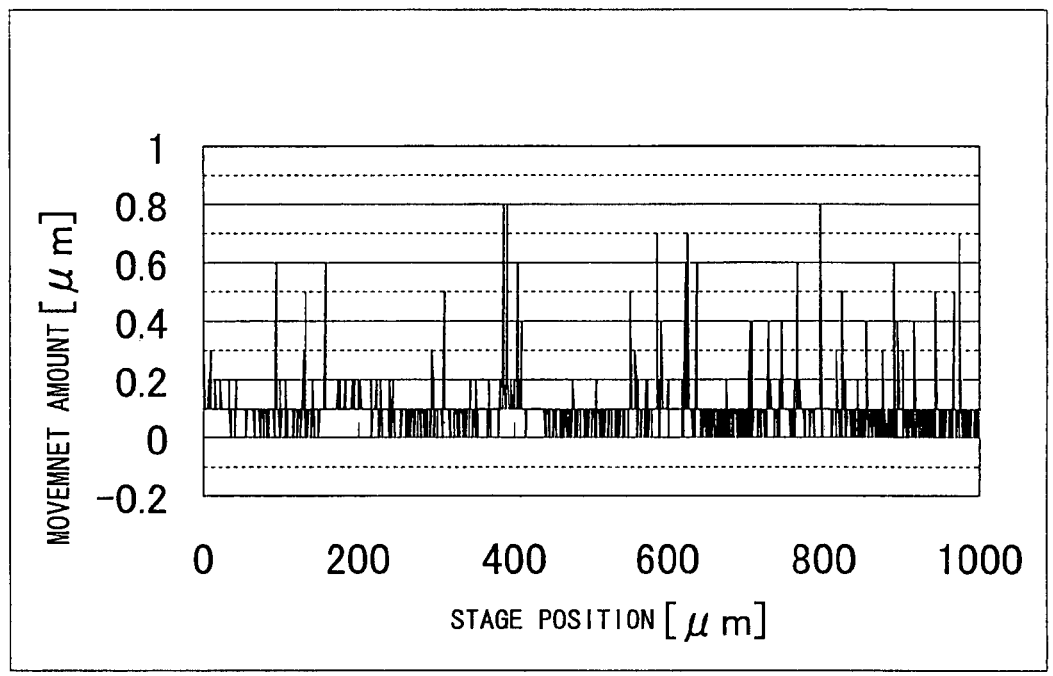
F I G. 3 A
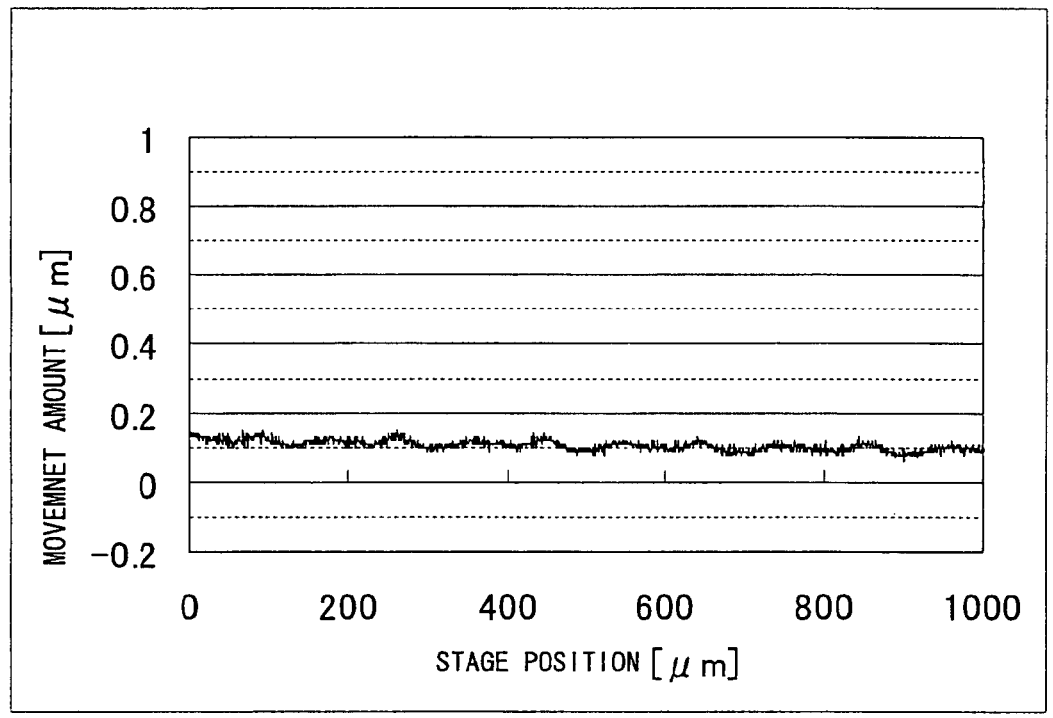
F I G. 3 B

MOTORIZED TABLE APPARATUS AND MICROSCOPE STAGE

CROSS-REFERENCE TO RELATED APPLICATIONS

This application is based upon and claims the benefit of priority from the prior Japanese Patent Application No. 2006-189331, filed Jul. 10, 2006, the entire contents of which are incorporated herein by reference.

BACKGROUND OF THE INVENTION

1. Field of the Invention

The present invention relates to a motorized table apparatus, such as a microscope stage, allowing a use in a field requiring a positioning.

2. Description of the Related Art

A conventional motorized table apparatus for use in a microscope (simply noted as "motorized table" hereinafter) employs in its drive unit a rotary motor, such as a stepping motor, and a motion transmission mechanism for converting a rotational drive force of the motor into a directional movement of a table. These motor and motion transmission mechanism need a large installation space, hence creating a problem of protruding from the upper surface and/or outer periphery of the table. As an example, if an observer who has been using a manual table apparatus (simply noted as "manual table" hereinafter) by covering with by a box, such as a thermal insulation box, limiting a space surrounding the table, or using a manual table by placing various apparatuses, such as a micromanipulator and incubator wants to replace the manual table with a motorized table, the latter take a larger space than the former, and therefore it is difficult to simply replace the former.

In order to solve such a problem, proposed is a motorized table using an ultrasonic wave actuator as represented by Laid-Open Japanese Patent Application Publication Nos. 2005-265996 and 2000-28767.

SUMMARY OF THE INVENTION

A motorized table apparatus according to a first aspect of the present invention comprises a support unit for supporting a movement table so as to allow it to move in a single axis direction relative to a stationary unit which is fixed to the movement table; a slide member which is equipped on the movement table and which has a length equivalent to, or more than, a moving range of the movement table; an ultrasonic oscillator which is equipped on the stationary unit, which moves the movement table, and which comprises a single piezoelectric body and two drive elements; and a pressure application unit for supporting so that the two drive elements of the ultrasonic oscillator and the slide member are pressed by a constant force, wherein a plurality of the ultrasonic oscillators are equipped.

A motorized table apparatus according to a second aspect of the present invention comprises a support unit for supporting a movement table so as to allow it to move in a single axis direction relative to a stationary unit which is fixed to the movement table; a slide member which is equipped on the stationary unit and which has a length equivalent to, or more than, a moving range of the movement table; an ultrasonic oscillator which is equipped on the movement table, which moves the movement table and which comprises a single piezoelectric body and two drive elements; and a pressure application unit for supporting so that the two drive elements of the ultrasonic oscillator and the slide member are pressed by a constant force, wherein a plurality of the ultrasonic oscillators are equipped.

BRIEF DESCRIPTION OF THE DRAWINGS

FIG. 3A is a diagram exemplifying an operating characteristic of a conventional motorized table in which there are only two contact points between a drive element and a slide plates for one axis direction;

FIG. 3B is a diagram exemplifying an operating characteristic of the microscope stage according to the embodiment 1 in which there are four contact points between a drive element and a slide plates for one axis direction;

DESCRIPTION OF THE PREFERRED EMBODIMENTS

The following is a description of the preferred embodiment of the present invention by referring to the accompanying drawings.

Embodiment 1

Figure 1:
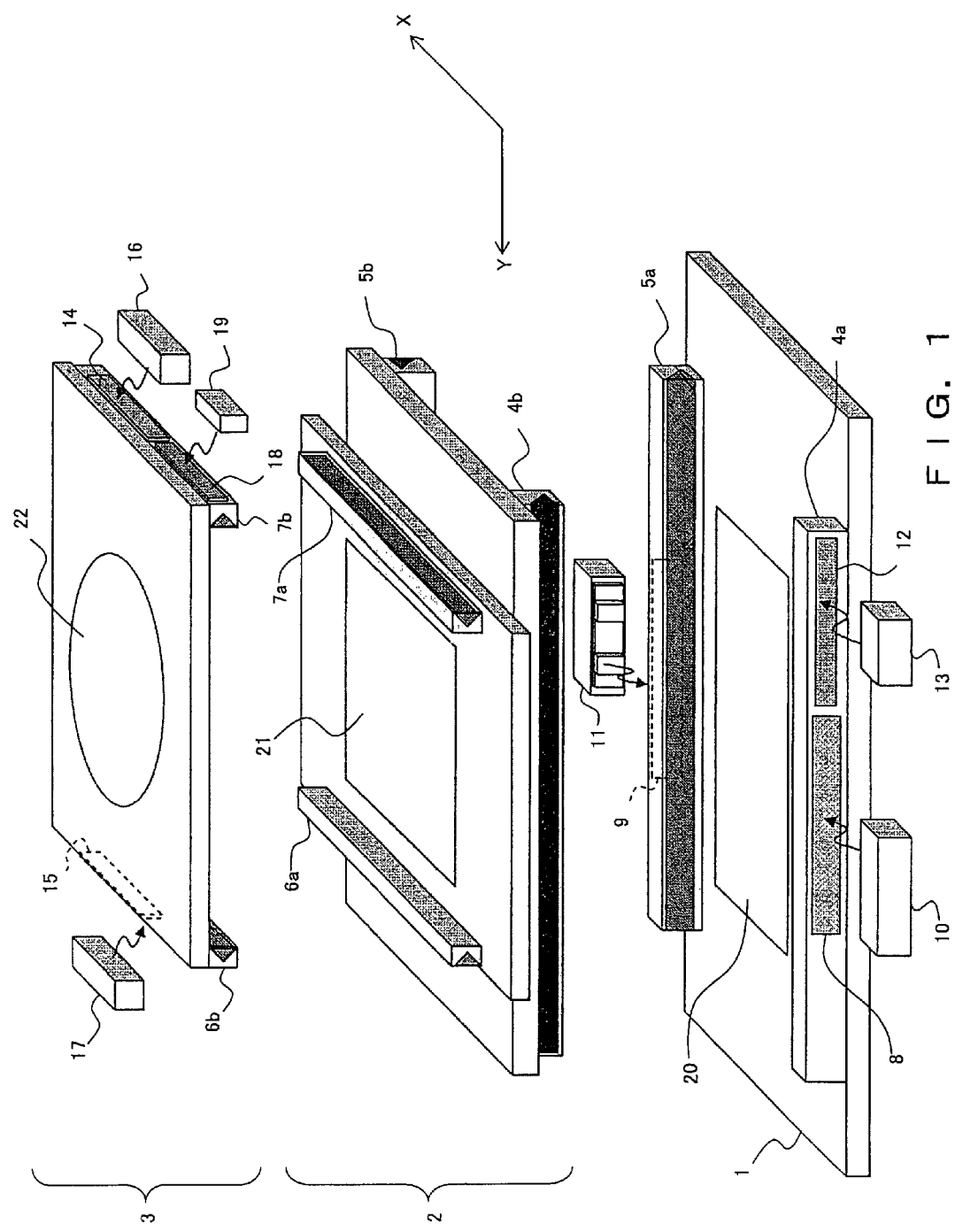
FIG. 1 is a diagram showing a configuration of a microscope stage which is a motorized table apparatus according to a preferred embodiment 1.

FIG. 1 is a diagram showing a configuration of a microscope stage which is a motorized table apparatus according to the embodiment 1 of the present invention.

The microscope stage shown in FIG. 1 is roughly divided into a stationary base 1, a Y table 2 and an X table 3, with the Y table 2 being supported so as to allow it to move in the Y direction relative to the stationary base 1, and the X table 3 being supported so as to allow it to move in the X direction relative to the Y table 2. Note that the Y table 2 can also be defined as a stationary unit which is fixed relative to the X table 3.

What supports the Y table 2 so as to allow it to move in the Y direction are first guides 4 (i.e., 4a and 4b) and 5 (i.e., 5a and 5b) which are support means, such as cross roller guides, fixed onto the top surface of the stationary base 1 and the bottom surface of the Y table 2, and what supports the X table 3 so as to allow it to move in the X direction are second guides 6 (i.e., 6a and 6b) and 7 (i.e., 7a and 7b) which are support means, such as cross roller guides, fixed onto the top surface of the Y table 2 and the bottom surface of the X table 3.

Slide plates 8 and 9 are mounted onto the respective side surfaces of first guides 4a and 5a which are fixed onto the stationary base 1. The mounting positions of the slide plates 8 and 9 are preferably such that the longitudinal center line of the slides 8 and 9 is parallel with the moving direction of the Y table 2 and also on a plane which goes through the center line of the guide direction of the first and second guides 4a and 5a; they are not necessarily limited to the positions, however. Meanwhile, the lengths of the slide plates 8 and 9 in the longitudinal direction are lengths equivalent to, or more than, the moving range of the Y table 2 relative to the stationary base 1.

Ultrasonic motors 10 and 11 are placed so as to be fixed onto the bottom surface of the Y table 2 and contacted to the slide plates 8 and 9, respectively. Such placement makes the ultrasonic motors 10 and 11 placed opposite so as to sandwich the stationary base 1. Note, FIG. 1 shows the ultrasonic motors 10 and 11 in simplification; they are actually configured as shown in a later described FIG. 2, however.

A linear scale 12 is fixed onto the side surface of the first guide 4a which is fixed onto the stationary base 1. While the mounting position of the linear scale 12 is such that the center line of the linear scale 12 in the longitudinal direction is parallel with the moving direction of the Y table 2 and also on the plane going through the center line of the respective guide directions of the first guides 4a and 5a; the mounting position, however, may be discretionary, provided that it is a position where the center line of the longitudinal direction of the linear scale 12 is fixed onto the stationary base 1 in parallel with the moving direction of the Y table 2.

A sensor head 13 is placed so as to be fixed to the bottom surface of the Y table 2 and opposite to the linear scale 12.

Slide plates 14 and 15 are mounted onto the respective side surfaces of the second guides 6b and 7b which are fixed onto the X table 3. The mounting positions of the slide plates 14 and 15 are preferably such that the longitudinal center lines of the slide plates 14 and 15 are in parallel with the moving direction of the X table 3 and also on a plane going through the center line of the respective guide directions of the second guides 6b and 7b; the positions, however, may not be limited as such. Meanwhile, the longitudinal length of the slide plates 14 and 15 are respectively equivalent to, or more than, the moving range of the X table 3 relative to the Y table 2.

Ultrasonic motors 16 and 17 are placed so as to be fixed onto the top surface of the Y table 2 and in contact with the slide plates 14 and 15, respectively. Such placement makes the ultrasonic motors 16 and 17 placed opposite so as to sandwich the X table 3. Note, FIG. 1 also shows the ultrasonic motors 16 and 17 in simplification; they are actually configured as shown in a later described FIG. 2, however.

A linear scale 18 is fixed onto the side surface of the second guide 7b which is fixed onto the X table 3. While the mounting position of the linear scale 18 is such that the center line of the linear scale 18 in the longitudinal direction is parallel with the moving direction of the X table 3 and also on the plane going through the center line of the respective guide directions of the second guides 6b and 7b; the mounting position, however, may be discretionary, provided that it is a position where the center line of the longitudinal direction of the linear scale 18 is fixed onto the X table 3 in parallel with the moving direction thereof.

A sensor head 19 is placed so as to be fixed onto the top surface of the Y table 2 and opposite to the linear scale 18.

Figure 2:
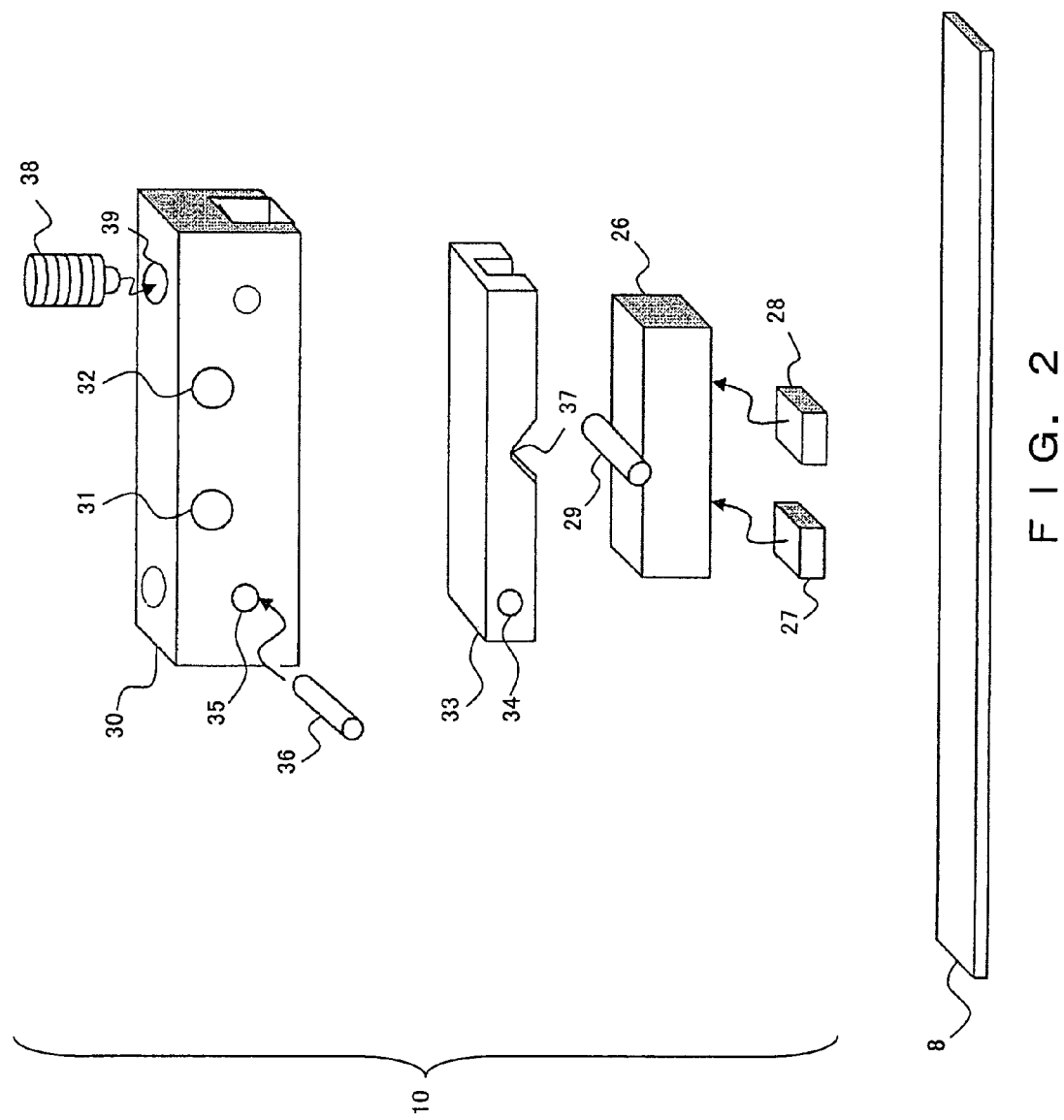
FIG. 2 is a diagram showing a detail of a configuration of an ultrasonic motor.

Here, the description is on a configuration of the ultrasonic motor in detail by referring to FIG. 2. The present embodiment is configured to use the same configuration for the ultrasonic motors 10, 11, 16 and 17, and therefore the description is provided here by letting the ultrasonic motor 10 represent them.

FIG. 2 is a diagram showing a detail of a configuration of the ultrasonic motor 10.

Referring to FIG. 2, two drive elements 27 and 28 are mounted onto a layered piezoelectric element 26 oscillating by being applied by an electric signal, and the drive elements 27 and 28 are in contact with the slide plate 8 with a prescribed force. The drive elements 27 and 28 have a plane-to-plane contact respectively with the slide plate 8. Note that one layered piezoelectric element 26 and two drive elements 27 and 28 constitute one ultrasonic oscillator. A support pin 29 is fixed onto the top surface of the layered piezoelectric element 26 with an adhesive, or such.

Meanwhile, a stationary member 30 is fixed onto the Y table 2 by screws, or such, going through fixing screw holes 31 and 32. In the inside of the stationary member 30 is featured with a groove of a width allowing an insertion of a support member 33 so that the insertion of fixing pin 36 into respective fixing pin-use holes 34 and 35 in the state of the support member 33 being inserted into the groove part of the stationary member 30 fixes between the support member 33 and stationary member 30. In this case, the support member 33 is fixed onto the stationary member 30 rotatably against the stationary member 30 around the fixing pin 36 as axis.

The support pin 29 fixed onto the top surface of the layered piezoelectric element 26 is supported without a play by a V-shaped support pin reception part 37 featured in the bottom of the support member 33. A pressure force with which the slide plate 8 and drive elements 27 and 28 are in contact with one another is applied by a pressure application member 38 such as a plunger. A male screw is usually formed on the periphery of the pressure application member 38. Therefore, the pressure application member 38 is screwed into a pressure application member-use tap 39 featured in the stationary member 30. As it is screwed in, the tip part of the pressure application member 38 is pressed against the top surface of the support member 33. In this case, the support member 33 rotates around the fixing pin 36. This rotation results in pressing the support pin 29 which is in contact with the V-shaped support pin reception part 37 featured at the bottom surface of the support member 33 in the same direction as the pressing direction of the pressure application member 38. Associated with this, the support pin 29, layered piezoelectric element 26 and drive elements 27 and 28 are integrally fixed, thereby pressing the drive elements 27 and 28 onto the slide plate 8. Further screwing the pressure application member 38 further increases the pressing force. The ultrasonic motor 10 comprises a pressure application mechanism, that is, pressure application means, so that the drive elements 27 and 28 are pressed onto the slide plate 8 with a prescribed constant force as described above.

The detail of the configuration of the ultrasonic motor is that one ultrasonic motor is equipped with the two drive elements 27 and 28 as described above. As a result, there are four contact spots between the slide plates 14 and 15 and the drive elements which are involved in a movement of the X table 3 because two ultrasonic motors 16 and 17 are placed opposite to the X table 3. Likewise, there are also four contact spots between the slide plates 8 and 9 and drive elements which are involved in a movement of the Y table 2.

Meanwhile, the microscope stage shown in FIG. 1 premises a use by fixing the stationary base 1 onto a microscope or such, and therefore the centers of the stationary base 1, Y table 2 and X table 3 are featured with opening parts 20, 21 and 22, respectively, so as to allow a passage of light. This prevents a barrier against a microscopic observation.

Note that the microscope stage according to the present embodiment is configured such that the two drive elements of the ultrasonic motor 10 contacts securely with the slide plate 8, and the two drive elements of the ultrasonic motor 11 contacts securely with the slide plate 9, within the moving range of the Y table 2 relative to the stationary base 1. Likewise, the two drive elements of the ultrasonic motor 16 contacts securely with the slide plate 14, and the two drive elements of the ultrasonic motor 17 contacts securely with the slide plate 15, within the moving range of the X table 3 relative to the Y table 2.

The next is a description on operations of the tables of the microscope stage.

Note that the present embodiment is configured such that the basic operation of the ultrasonic motors 10, 11, 16 and 17 when they are applied with an electric signal is the same as noted in the URL "http://www.olympus.co.jp/jp/crdc/tech/1997b/bm9712 00uslmj.cfm", for example. Meanwhile, the sensor heads 13 and 19 use the optical linear encoder as noted in the Laid-Open Japanese Patent Application Publication No. H11-243258, for example.

When the Y table 2 is desired to move in the Y direction on the microscope stage, an electric signal is applied to the ultrasonic motors 10 and 11. The application of the electric signal makes the ultrasonic motors 10 and 11 move on the slide plates 8 and 9. The ultrasonic motors 10 and 11 are fixed onto the Y table 2 which is supported by the first guides 4 and 5 allowing a movement in the Y direction relative to the stationary base 1, and therefore the Y table 2 moves in the Y direction. The movement amount is detected by the linear scale 12 and sensor head 13, enabling a calculation of an error against the target position. An electric signal is applied to the ultrasonic motors 10 and 11 until the error amount becomes no more than a target value, thereby moving the Y table 2 in the Y direction. The drive torque necessary for the movement is generated by the friction force by the contact of drive elements respectively equipped in the ultrasonic motors 10 and 11 with the slide plates 8 and 9, respectively.

Meanwhile, when the X table 3 is to be moved in the X direction, an electric signal is applied to the ultrasonic motors 16 and 17. The application of the electric signal makes the ultrasonic motors 16 and 17 move relatively on the slide plates 14 and 15. The ultrasonic motors 16 and 17 are fixed onto the Y table 2. The X table 3 is supported by the second guides 6 and 7 so as to allow a movement in the X direction relative to the Y table 2 and therefore the X table 3 moves in the X direction. The movement amount is detected by the linear scale 18 and sensor head 19, enabling a calculation of error against a target position. An electric signal is applied to the ultrasonic motors 16 and 17 until the error amount becomes no more than a target value, thereby moving the X table 3 in the X direction. The drive torque necessary for the movement is generated by the friction force by the contact of the drive elements respectively equipped in the ultrasonic motors 16 and 17 with the slide plates 14 and 15.

The configuration and operation of the microscope stage as described above make it possible to alleviate an influence of a variation of friction force between the drive elements and slide plates, and move the table stably. In the conventional motorized table apparatus, there have been only two contact points between the drive elements and slide plates for one axis direction, creating the problem of the movement amount fluctuating greatly, resulting in degrading the operating characteristic as an X-Y table, if the friction force of either one of the contact points is varied for some reason. Contrarily, the microscope stage according to the present embodiment is configured such that the number of contact parts between the drive elements and slide plates increases to four for one axis direction and therefore, even if a fluctuation of friction force is caused in either one of the contact parts, a variation of the movement amount can be greatly reduced, thereby preventing a large degradation of the operating characteristic as an X-Y table.

The description at this time is on a difference of operating characteristics between the conventional motorized table apparatus, which has only two contacts points between the drive elements and slide plates for one axis direction, and the microscope stage according to the present embodiment, which has four contact parts between the drive elements and slide plates for one axis direction, by referring to FIGS. 3A and 3B.

FIG. 3A is a diagram exemplifying an operating characteristic of a conventional motorized table apparatus in which there are only two contact points between a drive element and a slide plate for one axis direction; and FIG. 3B is a diagram exemplifying an operating characteristic of the microscope stage according to the embodiment 1 in which there are four contact parts between a drive element and a slide plate for one axis direction. FIGS. 3A and 3B each shows an operating characteristic when an electric signal is applied so as to move a stage by 0.1 micrometers in one axis direction.

The conventional motorized table apparatus allows a large fluctuation in an actual movement amount against the applied electric signal of 0.1 micrometers, whereas the microscope stage according to the present embodiment largely keeps the actual movement amount against the applied electric signal of 0.1 micrometers, thus obtaining a good operating characteristic, as shown in FIGS. 3A and 3B.

Embodiment 2

A motorized table apparatus according to the embodiment 2 of the present invention is a single axis stage in place of an X-Y two-axis stage; otherwise it is the same configuration and operation as the microscope stage according to the embodiment 1.

Figure 4:
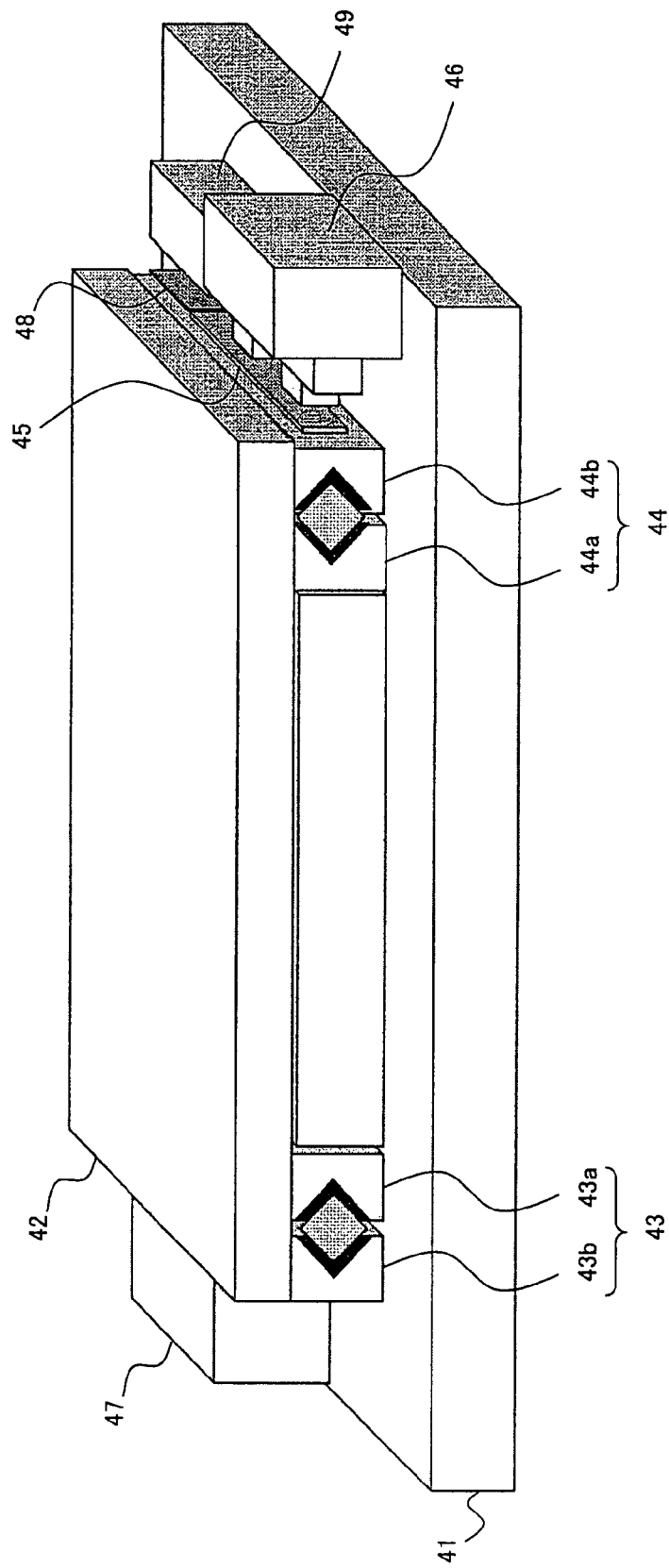
FIG. 4 is diagram showing a configuration of a motorized table apparatus according to a preferred embodiment 2.

FIG. 4 is a diagram showing a configuration of a motorized table apparatus according to the present embodiment.

The motorized table apparatus comprises a stationary base 41 and a movement table 42 as major components, with the movement table 42 being supported so as to allow a movement in one axis direction relative to the stationary base 41 as shown in FIG. 4. What supports the movement table 42 so as to allow a movement in one axis direction are guides 43 (i.e., 43a and 43b) and 44 (i.e., 44a and 44b), which are support means such as a cross-roller guide, fixed onto the top surface of the stationary base 41 and the bottom surface of the movement table 42.

The respective side surfaces of the guides 43b and 44b which are fixed onto the bottom surface of the movement table 42 are respectively attached with slide plates (i.e., the slide plate attached to the side surface of the guide 43b is not shown in a drawing herein, while the slide plate attached to the side surface of the guide 44b is the numeral 45). The attachment position of the slide plates are similar to the position described for the embodiment 1. The respective lengths of the slide plates in the longitudinal direction are equivalent to, or more than, the moving range of the movement table 42 relative to the stationary base 41.

Ultrasonic motors 46 and 47 are placed so as to be fixed onto the top surface of the stationary base 41 and in contact with the slide plates, respectively. Such placements result in placing the ultrasonic motors 46 and 47 opposite to each other so as to sandwich the movement table 42. Note that FIG. 4 shows a simplification of the ultrasonic motors 46 and 47, which are actually configured as the one shown in the above described FIG. 2.

The linear scale 48 is fixed onto the side surface of the guide 44b fixed onto the bottom surface of the movement table 42. The mounting position of the linear scale 48 is also similar to the position described in the embodiment 1.

The sensor head 49 is placed so as to be fixed onto the top surface of the stationary base 41 and opposite to the linear scale 48.

Note that the motorized table apparatus according to the present embodiment is configured such that the two drive elements of the ultrasonic motor 46 are securely in contact with the slide plate 45, and that the two drive elements of the ultrasonic motor 47 are securely in contact with a slide plate (not shown in a drawing herein), within the moving range of the movement table 42 relative to the stationary base 41.

The next is a description on a table operation of the motorized table apparatus according to the present embodiment. This is also basically similar to that of the microscope stage according to the embodiment 1. That is, when the movement table 42 is desired to move in one axis direction, an electric signal is applied to the ultrasonic motors 46 and 47. The application of the electric signal makes the ultrasonic motors 46 and 47 move relatively on the slide plates. The ultrasonic motors 46 and 47 are fixed onto the stationary base 41, and the movement table 42 is supported by the guides 43 and 44 so as to allow a movement in a single axis direction relative to the stationary base 41, and therefore the movement table 42 moves in the single axis direction. The movement amount is detected by the linear scale 48 and sensor head 49, enabling a calculation of an error against the target position. An electric signal is applied to the ultrasonic motors 46 and 47 until the error amount becomes no more than a target value, thereby moving the movement table 42 in the single axis direction. The drive torque necessary for the movement is generated by the friction force by the contact of drive elements respectively equipped in the ultrasonic motors 46 and 47 with the slide plates.

The configuration and operation of the motorized table apparatus as described above make it possible to alleviate an influence of a variation of the friction force between the drive elements and slide plates, and drive the table stably likewise the microscope stage according to the embodiment 1.

Embodiment 3

A motorized table apparatus according to the embodiment 3 of the present invention is configured to place two ultrasonic motors lined up on one side, in place of them being opposite to each other, it is otherwise basically the same as the configuration and operation of the motorized table apparatus according to the embodiment 2.

Figure 5:
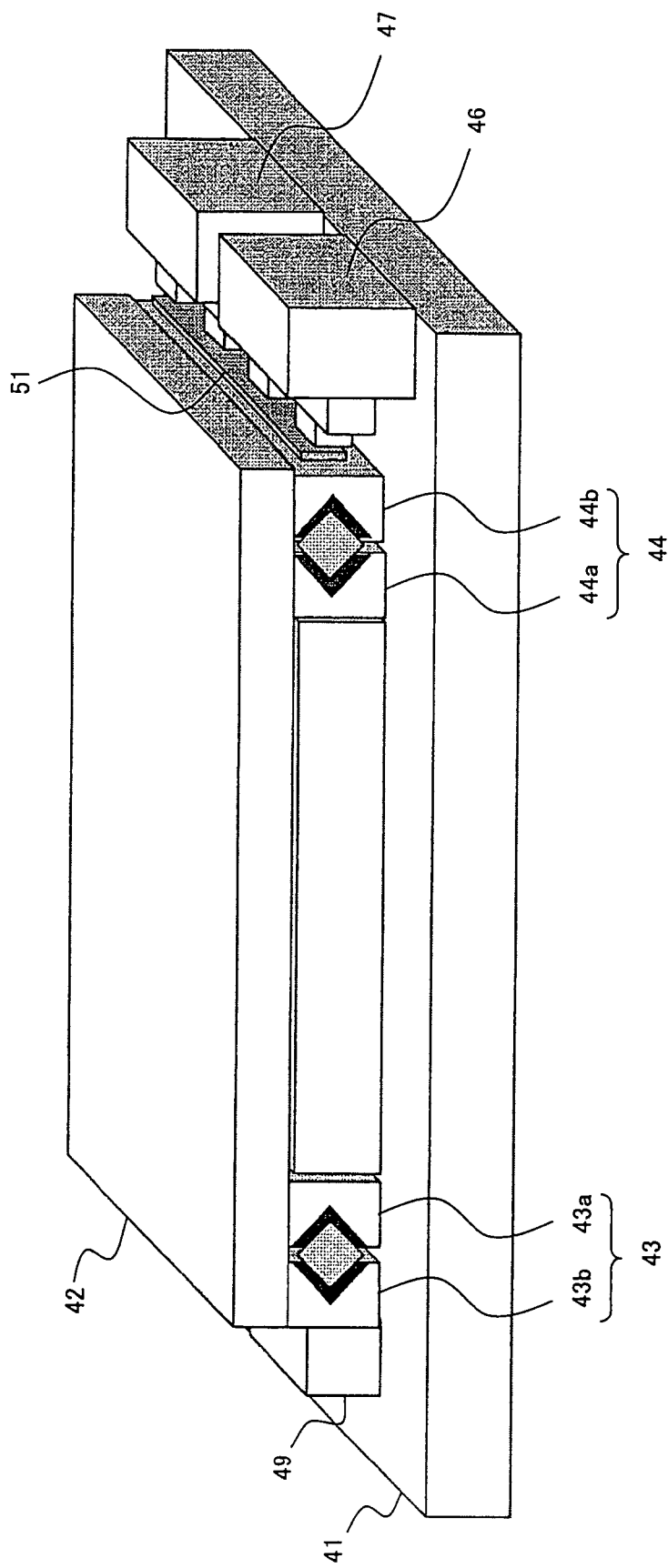
FIG. 5 is a diagram showing a configuration of a motorized table apparatus according to a preferred embodiment 3.

FIG. 5 is a diagram showing a configuration of a motorized table apparatus according to the present embodiment. Note that, in the showing FIG. 5, the same component sign is assigned to the same constituent component shown in FIG. 4.

The motorized table apparatus according to the present embodiment is configured such that, associated with placing the two ultrasonic motors 46 and 47 lined up on one side, the linear scale 48 (not shown in FIG. 5) is fixed onto the side surface of the guide 43b fixed onto the bottom surface of the movement table 42 and the sensor head 49 is fixed onto the top surface of the stationary base 41 and is placed so as to be opposite to the linear scale 48 as shown in FIG. 5. A single slide plate 51 for the two ultrasonic motors 46 and 47 is fixed onto the guide 44b. It is otherwise configured similar to the motorized table apparatus according to the embodiment 2.

As for a table operation of the motorized table apparatus configured as described above, a movement of the movement table 42 uses the two ultrasonic motors 46 and 47 placed by lining up on one side; it is otherwise similar to that of the motorized table apparatus according to the embodiment 2 and therefore the description is omitted here.

The configuration and operation of the motorized table apparatus as described above make it possible to alleviate an influence of a variation of the friction force between the drive elements and slide plate and drive the table stably likewise the microscope stage according to the embodiment 2.

Note that the motorized table apparatus according to the present embodiment can also be configured to further elongate the longitudinal length of the slide plate 51 so that the entirety of the oscillators of the respective ultrasonic motors 46 and 47 are in contact with the slide plate 51 without fail within the moving range of the movement table 42 relative to the stationary base 41. The length in such a case is apparently the length equivalent to, or more than, the moving range of the movement table 42 relative to the station base 41.

As such, the present invention has been described in detail, whereas the present invention can of course be improved or changed in various manners possible within the scope thereof in lieu of being limited to the above described embodiments.

As described above, the present invention is contrived to enable an alleviation of degradation of an operating characteristic of a table due to a fluctuation of friction force at the contact part between the drive element and driven body of an ultrasonic oscillator and a stable movement of the table.

What is claimed is:
1. A motorized table apparatus, comprising:
a support unit for supporting a movement table so as to allow the movement table to move in a single axis direction relative to a stationary unit which is fixed to the movement table;
one or more slide members at least one of which is equipped on the movement table and has a length equivalent to, or more than, a moving range of the movement table; and
a plurality of ultrasonic oscillators each of which is equipped on the stationary unit, moves the movement table, and includes a single piezoelectric body, two drive elements, and a pressure application unit that presses the two drive elements against one of the one or more slide members by a constant force;
wherein a pressing direction in which the pressure application unit of each of the plurality of ultrasonic oscillators presses the one or more slide members is a side surface direction toward a side surface of the movement table and is a direction perpendicular to a moving direction of the movement table.

2. The motorized table apparatus according to claim 1, wherein the pressing direction of the pressure application unit of each of the plurality of ultrasonic oscillators is a direction toward a center line of the movement direction of the movement table.

3. The motorized table apparatus according to claim 1, wherein the two drive elements of each of the plurality of ultrasonic oscillators have a plane-to-plane contact respectively with the one or more slide members.

4. A motorized table apparatus, comprising:
a support unit for supporting a movement table so as to allow the movement table to move in a single axis direction relative to a stationary unit which is fixed to the movement table;
one or more slide members at least one of which is equipped on the stationary unit and has a length equivalent to, or more than, a moving range of the movement table;
a plurality of ultrasonic oscillators each of which is equipped on the movement table, moves the movement table, and includes a single piezoelectric body, two drive elements, and a pressure application unit that presses the two drive elements against one of the one or more slide members by a constant force;

wherein a pressing direction in which the pressure application unit of each of the plurality of ultrasonic oscillators presses the one or more slide members is a side surface direction toward a side surface of the movement table and is a direction perpendicular to a moving direction of the movement table.

5. The motorized table apparatus according to claim 4, wherein the pressing direction of the pressure application unit of each of the plurality of ultrasonic oscillators is a direction toward a center line of the movement direction of the movement table.

6. The motorized table apparatus according to claim 4, wherein the two drive elements of each of the plurality of ultrasonic oscillators have a plane-to-plane contact respectively with the one or more slide members.

7. A microscope stage, comprising:
a stationary base fixed to a microscope;
a first movement table movable along a first axis relative to the stationary base;
a second movement table movable along a second axis approximately perpendicular to the first axis relative to the first movement table;
a first support unit for supporting the first movement table so as to allow the first movement table to move in a first axis direction relative to the stationary base;
a second support unit for supporting the second movement table so as to allow the second movement table to move in a second axis direction relative to the first movement table;
one or more first slide members at least one of which is equipped on the stationary base and has a length equivalent to, or more than, a moving range of the first movement table;
one or more second slide members at least one of which is equipped on the second movement table and has a length equivalent to, or more than, a moving range of the second movement table;
a plurality of first ultrasonic oscillators each of which is equipped on the first movement table, moves the first movement table in the first axis direction, and includes a single piezoelectric body, two drive elements, and a pressure application unit that presses the two drive elements against one of the one or more first slide members by a constant force; and
a plurality of second ultrasonic oscillators each of which is equipped on the first movement table, moves the second movement table in the second axis direction, and includes a single piezoelectric body, two drive elements, and a pressure application unit that presses the two drive elements against one of the one or more second slide members by a constant force;
wherein a pressing direction in which the pressure application unit of each of the plurality of first ultrasonic oscillators presses the one or more first slide members is a side surface direction toward a side surface of the first movement table and is a direction perpendicular to a moving direction of the first movement table; and
wherein a pressing direction in which the pressure application unit of each of the plurality of second ultrasonic oscillators presses the one or more second slide members is a side surface direction toward a side surface of the second movement table and is a direction perpendicular to a moving direction of the second movement table.

\* \* \* \* \*